(12) United States Patent
Loibl et al.

(10) Patent No.: US 6,616,486 B2
(45) Date of Patent: Sep. 9, 2003

(54) CONFIGURATION FOR MAKING ELECTRICAL CONTACT WITH A VALVE

(75) Inventors: Josef Loibl, Bad Abbach (DE); Ulf Scheuerer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/109,745

(22) Filed: Mar. 28, 2002

(65) Prior Publication Data

US 2002/0127910 A1 Sep. 12, 2002

Related U.S. Application Data

(63) Continuation of application No. PCT/DE00/03321, filed on Sep. 25, 2000.

(30) Foreign Application Priority Data

Sep. 28, 1999 (DE) .......................................... 199 46 438

(51) Int. Cl.[7] .............................................. H01R 24/00
(52) U.S. Cl. ........................................ 439/660; 439/55
(58) Field of Search ........................... 439/660, 67, 65, 439/59, 547, 57, 81, 55; 336/192; 303/119.2, 119.1, 119.3; 335/202; 251/129.01, 129.09, 129.15, 129.16, 129.17, 129.14

(56) References Cited

U.S. PATENT DOCUMENTS

| | | | |
|---|---|---|---|
| 3,815,077 A | | 6/1974 | Anhalt et al. .................. 439/70 |
| 4,632,478 A | * | 12/1986 | Kozai et al. .................. 439/62 |
| 4,697,863 A | * | 10/1987 | Galloway et al. ............. 439/544 |
| 5,038,125 A | | 8/1991 | Vogel .......................... 335/202 |
| 5,269,490 A | | 12/1993 | Fujikawa et al. ...... 251/129.15 |
| 5,949,320 A | * | 9/1999 | Cossins et al. ............. 336/223 |

FOREIGN PATENT DOCUMENTS

| | | |
|---|---|---|
| DE | 38 33 474 C2 | 4/1990 |
| DE | 42 33 783 A1 | 4/1993 |
| DE | 43 24 781 A1 | 1/1995 |
| DE | 197 25 289 A1 | 12/1998 |

* cited by examiner

*Primary Examiner*—Ross Gushi
(74) *Attorney, Agent, or Firm*—Laurence A. Greenberg; Werner H. Stemer; Gregory L. Mayback

(57) ABSTRACT

The configuration makes electrical contact with an electric valve, in particular a shift or pressure regulating valve for automatic transmissions of motor vehicles. The configuration is equipped with a contact spring element arranged outside a valve housing of the electric valve. In the assembled state, the contact spring element acts on an exposed opposing contact element of a wiring element under spring pressure. For this purpose, the contact spring element has a pressing section with a rounded bearing surface and the mutual contact surfaces on the spring element and on the wiring element are tinned.

9 Claims, 2 Drawing Sheets

CONFIGURATION FOR MAKING ELECTRICAL CONTACT WITH A VALVE

CROSS-REFERENCE TO RELATED APPLICATION

This application is a continuation of copending International Application No. PCT/DE00/03321, filed Sep. 25, 2000, which designated the United States.

BACKGROUND OF THE INVENTION

Field of the Invention

The invention relates to a configuration for making electrical contact with an electric valve, in particular a shift or pressure regulating valve for automatic transmissions of motor vehicles. The system has an electric wiring element wherein the electric valve is equipped with contact spring elements that are arranged outside the valve housing and that, in the assembled state, act on exposed opposing contact elements of the wiring element under spring pressure.

In automatic transmissions, hydraulic devices are driven by electric valves. Since the valves are integrated into the transmission only during final assembly, their fitting is normally carried out by means of plug-in fastenings, which are provided at a suitable point within the transmission.

In a construction of this type, one difficulty consists in achieving a secure and long-term stable electrical contact with the electric valve. The requirements on the contact-making security are extremely high in practice since, firstly, extreme ambient conditions (temperatures between −40° C. and 140° C., vibration accelerations up to 33 g) prevail in the transmission and, secondly, (because of high repair costs and possible danger to persons in the event of a failure) the highest reliability requirements must be complied with.

A further aspect, which is closely connected with making contact with the electric valve, relates to the implementation of the electric feed lines for the electric valve. The object is cost-effective feed line concepts which permit optimum routing and arrangement of individual conductors within the transmission.

U.S. Pat. No. 5,269,490 (German published patent application DE 42 33 783 A1) describes a solenoid valve which, when it is inserted into a fixing element, is connected via a penetration contact arrangement to one end of a wiring element running in the fixing element. At its other end, the wiring element is connected to a contact pin belonging to a plug which is implemented on the upper side of the fixing element. The overall construction is quite complicated and, in addition, the penetration contact arrangement does not always meet the requirements in practice placed on the contact-making security.

U.S. Pat. No. 5,447,288 (German published patent application DE 43 24 781 A1) describes a further plug-in solenoid valve. The electrical connections fitted to the outside of the valve body are configured as spring contacts. Electrical contact is made by way of a contact pin oriented in the plug-in direction and belonging to the spring element and which, with one end, presses on an opposing contact under defined pressure.

U.S. Pat. No. 5,038,125 (German published patent application DE 38 33 474 A) describes a valve block for a controlled-slip hydraulic braking system. A conductor track substrate with an integral ring seal extends into the inner region of the valve body. In order to make contact with the valve coil, a contact spring with a bent bearing area is in contact there with an exposed conductor track belonging to the conductor track substrate.

SUMMARY OF THE INVENTION

It is accordingly an object of the invention to provide an electrical contacting configuration for a valve, which overcomes the above-mentioned disadvantages of the heretofore-known devices and methods of this general type and which permanently ensures a high degree of contact-making security, on the basis of the contact-making material used.

With the foregoing and other objects in view there is provided, in accordance with the invention, a configuration for making electrical contact between an electric valve, in particular a shift or pressure valve in an automatic transmission of a motor vehicle, and an electric wiring element, such as a printed circuit board. The configuration comprises:

at least one contact spring element disposed outside a valve housing of the electric valve;

the contact spring element having a pressing section with a tinned, rounded bearing surface;

an opposing contact element of the electric wiring element having a tinned opposing bearing surface;

whereby, in an assembled state, the tinned, rounded bearing surface of the contact spring element bears against the tinned opposing bearing surface of the wiring element under spring pressure.

By means of a tinned pressing section of the bearing surface and a tinned opposing surface of the opposing contact element, a low-wear contact point is implemented, which ensures fault-resistant and reliable functioning of the electric valve. The required contact quality can therefore be maintained for a sufficiently long time period (lifetime of the transmission).

With this material pairing, the best results with respect to the electric contact resistance were obtained during tests.

The bearing surface can be implemented both in the form of a spherical surface and in the form of a cylindrical circumferential surface.

In accordance with an added feature of the invention, the pressing section of the contact spring element is arcuate-shaped. That is, the contact spring element preferably has a pressure section which runs in the shape of an arc and whose outer side forms the bearing surface.

A particularly preferred refinement of the invention is distinguished by the fact that the wiring element is a flexible printed circuit board. Because of the low wear in the region of the contact point, the opposing contact element in this case can be implemented as a simple surface metalization of a conductor track belonging to the printed circuit board. The use of a flexible printed circuit board, made possible by the invention, is advantageous from the point of view of costs and proves to be beneficial in particular when, within the context of a total connection concept internal to a transmission, further mechatronic components (actuators, sensors, control electronics and so on) are to be attached electrically by means of the flexible printed circuit board.

Particularly good contact properties are achieved with a radius of curvature of the rounded bearing surface of approximately 1.2 to 1.7 mm.

A beneficial range for the spring force exerted on the opposing contact element lies between 12 and 15 N. A force lying in this range is firstly sufficiently high to make secure contact and secondly does not yet lead to relevant damage to the opposing contact element.

By means of structuring the bearing surface and/or by means of providing hooking elements projecting beyond the bearing surface, rubbing movement of the bearing surface on the opposing bearing surface can effectively be prevented.

In accordance with an additional feature of the invention, the contact spring element is formed with an S-shaped segment.

In accordance with another feature of the invention, the pressing section has a width of approximately 3 to 5 mm measured parallel to an axis of an arc defined by the arcuate shape.

In accordance with a further feature of the invention, the bearing surface of the pressing section is a structured surface.

In accordance with again an added feature of the invention, there are provided hooking elements formed on the pressing section and projecting beyond the bearing surface.

In accordance with a concomitant feature of the invention, the contact spring element is formed of copper-tin alloy, such as $CuSn_6$, and a copper-tin-nickel alloy, such as $CuNi_9Sn_2$.

Other features which are considered as characteristic for the invention are set forth in the appended claims.

Although the invention is illustrated and described herein as embodied in a configuration for making electrical contact with a valve, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
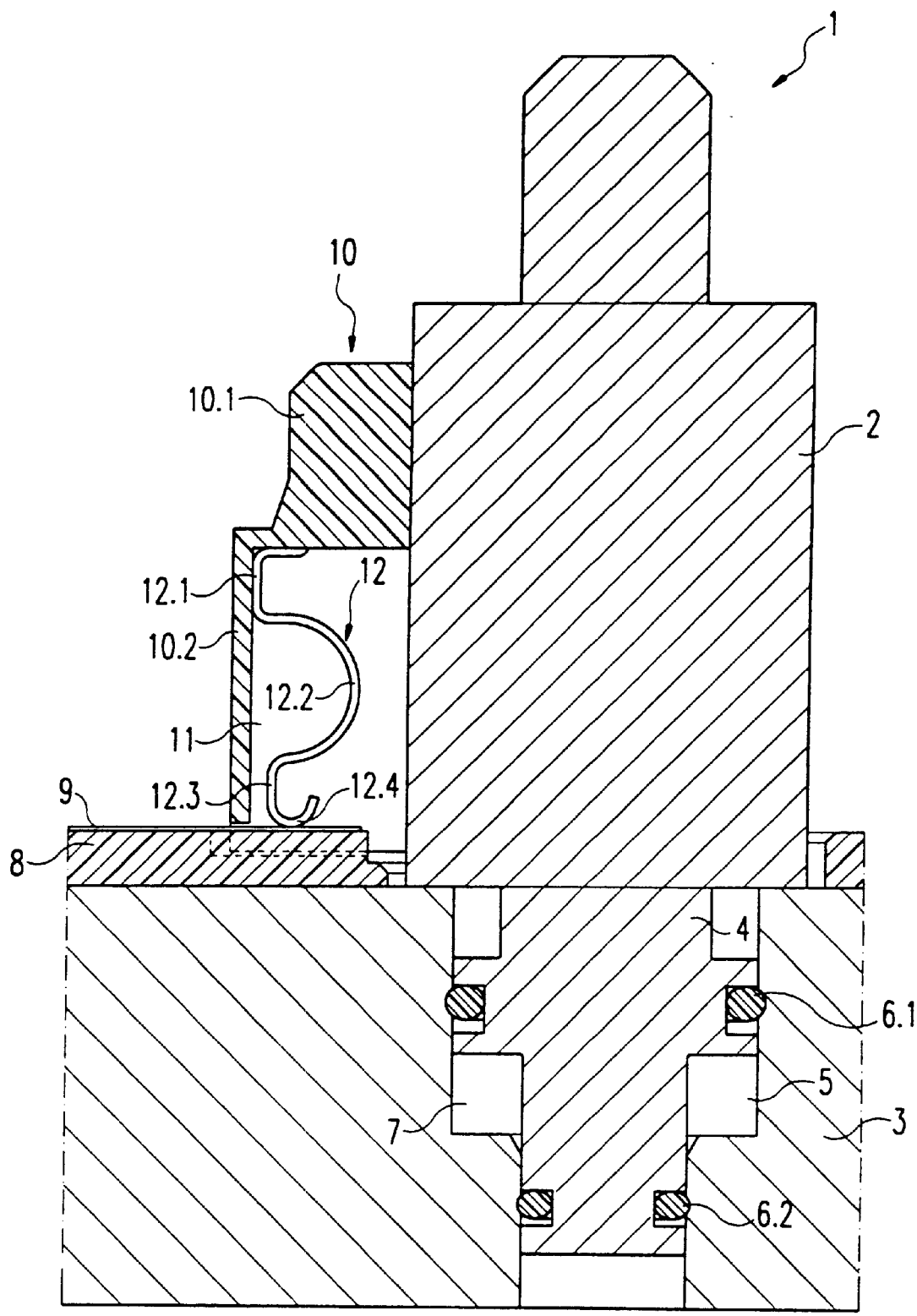
FIG. 1 is a schematic sectional view of a solenoid valve inserted in a fixing element and having a contact spring element making contact with a flexible printed circuit board.

Referring now to the figures of the drawing in detail and first, particularly, to FIG. 1 thereof, there is shown a solenoid valve 1 with a cylindrical valve body 2 which, via a plug-in fixing attachment not specifically illustrated in the bottom region, is coupled to a fixing element 3 of a subassembly located in the transmission. In the solenoid valve 1 there is provided an axially oriented magnetic coil, and a magnetic armature that penetrates a hole in the coil. The magnetic armature is connected in terms of movement to a piston element 4, which leaves the valve element 2 on the bottom side and is accommodated such that it can be displaced longitudinally and is sealed off in a cylindrical chamber 5 in the fixing element 3. The piston element 4 and the cylindrical chamber 5 define a pressure chamber 7, whose tightness is ensured by annular seals 6.1 and 6.2. The pressure chamber 7 is filled with a pressure fluid and is connected via pressure fluid ducts to a non-illustrated transmission shifting mechanism that can be actuated hydraulically.

On the upper side of the fixing element 3 there extends a carrier element 8 produced from plastic. The carrier element 8, in turn, bears on its upper side a flexible printed circuit board 9. The flexible printed circuit board 9 implements an integral electrical wiring element, via which a large number of electronic or electromechanical subassemblies (for example transmission controller, actuators, sensors) that are distributed within the transmission are connected electrically to one another. In this case, the carrier element 8 is used for the support and defined routing of the flexible printed circuit board 9 in the interior of the transmission.

The carrier element 8 is optional, that is to say the flexible printed circuit board 9 can also bear directly on the upper side of the fixing element 3.

A contact housing 10 made of plastic is fitted to the outer wall of the valve body 2. The contact housing 10 has a top section 10.1 and a side wall 10.2. The circumferential wall of the valve element 2, the top section 10.1 and the side wall 10.2 of the contact housing 10 form a border around a contact space 11, into which the flexible printed circuit board 9 projects at the bottom.

The contact space 11 is not sealed off in an oil-tight manner in the bottom area, so that it is possible for transmission fluid to penetrate into/emerge from the contact space 11. However, the side wall 10.2 implements effective protection against the penetration of metal chips into the contact space 11.

A contact spring element 12 is accommodated in the contact space 11. The contact spring element 12 is anchored by an upper section (which cannot be seen in FIG. 1) in the top section 10.1 of the contact housing 10. The upper section of the contact spring element 12 is connected, in a manner likewise not specifically illustrated, to an electrical lead through, which extends from the top section 10.1 through the wall of the valve body 2 and connects the contact spring element 12 electrically to the magnetic coil.

The upper fixing section of the contact spring element 12 is adjoined by an angled section 12.1. The two legs of the angled section 12.1 are oriented at 90° to each other and bear with their outer surface on the inner wall of the contact housing 10 in the transition region from the top section 10.1 to the side wall 10.2.

The angled section 12.1 of the contact spring element 12 is adjoined by a circular segment section 12.2. The circular segment section 12.2, in the prestressed state illustrated here, extends virtually over 180° and, by means of a bend, merges into a transition section 12.3 that runs in the axial direction of the valve 1. The lower end of the contact spring element 12 is implemented by a pressing section 12.4 which extends in the shape of an arc or skid. The contact spring element therefore has an S-shaped section.

The action of the contact spring element 12 is as follows:

When the solenoid valve 1 is inserted into the fixing element 3, the outer surface of the arcuate pressing section 12.4 of the contact spring element 12 comes into contact with the surface of the flexible printed circuit board 9. At the same time, the circular segment section 12.2 is deformed or compressed by an amount that is predefined by the design, as a result of which a corresponding spring force is produced in accordance with Hook's law.

The spring force can be predefined exactly by means of material selection and dimensioning of the contact spring 12, taking into account the precise installation position of the solenoid valve 1, and is 12 to 15 N, preferably 14 N. It has been shown that such a pressing force, in combination with the arcuate pressing section 12.4 according to the invention, is optimal in order, firstly, still to guarantee a secure electrical contact, even when severe vibrations occur, and, secondly, to avoid damage occurring to the flexible printed circuit board in the contact region over time. At the same time, it is critical that the outer surface of the arcuate pressing section 12.4 has a rounded, edge-free course in the region wherein it bears on the opposing contact element.

The outer surface of the pressing section 12.4 can bear directly on an exposed surface of a conductor track (for example one made of copper). However, it is more beneficial if a metalization (contact pad) is applied to the conductor track as an opposing contact element. Excellent mechanical and electrical contact-making properties are achieved with a contact pad made of tin and a tinned outer surface (bearing surface) of the pressing section 12.4.

The bearing surface of the pressing section 12.4 can be provided with slight embossing or structuring, which increases the positional stability of the pressing section 12.4 on the opposing contact element.

Figure 2A:
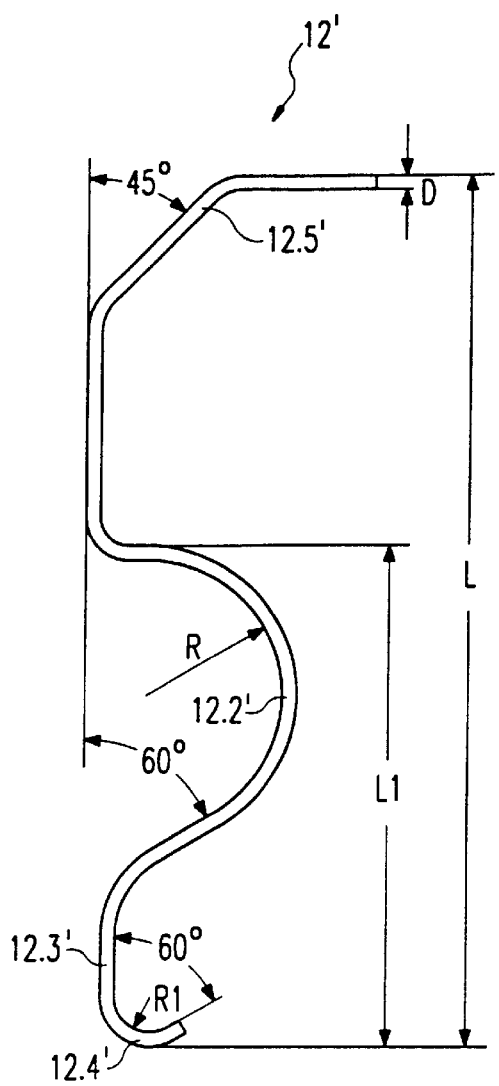
FIG. 2A is a longitudinal sectional illustration of a further contact spring element according to the invention, modified slightly as compared with the contact spring element illustrated in FIG. 1.
Figure 2B:
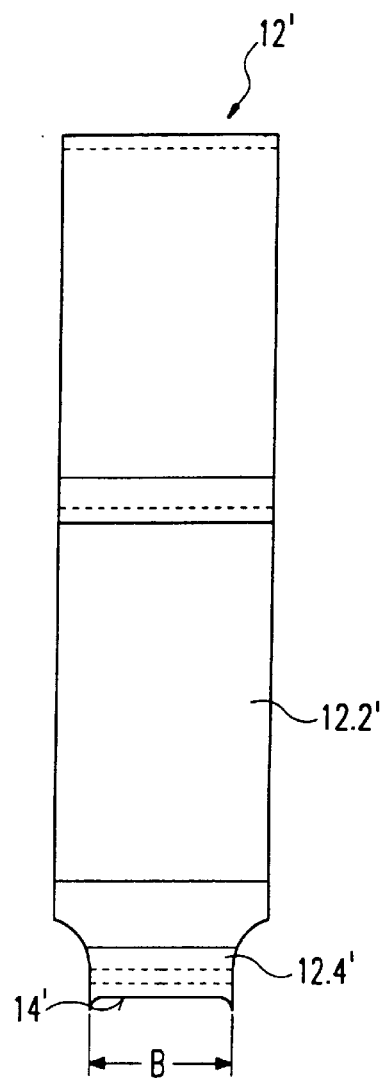
FIG. 2B is a side view of the contact spring element illustrated in FIG. 2A.

FIGS. 2A and 2B show a contact spring element 12' which differs from the contact spring element 12 shown in FIG. 1 only in the upper region (angled section 12.1) as a result of the addition of an inclined section 12.5' running at an angle of 45° with respect to the axial direction. The contact spring element 12' has a thickness D of 0.4 mm and an overall length L of 25.2 mm in the unstressed state. The radius of the circular segment section 12.2' is R=4 mm and merges into the transition section 12.3' at an angle of 60°.

The radius R1 of the arcuate pressing section 12.4' is 1.4 mm and preferably lies in a range between 1.2 and 1.7 mm. The arcuate course of the pressing section 12.4' can likewise form an angle of 60°. From the start of the circular segment section 12.2' as far as the vertex of the pressing section 12.4', a dimension L1=14.5 mm can be provided.

FIG. 2B makes it clear that the contact spring element 12' can have a lesser width in the region of the pressing section 12.4' than in the remaining region. The width B of the pressing section 12.4' (and also of the bearing surface 14') is, for example, 4 mm.

Figure 2C:
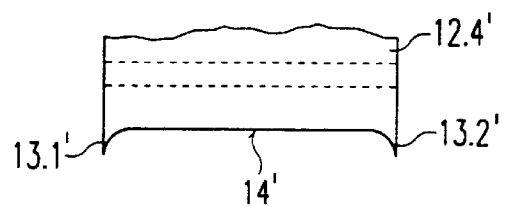
FIG. 2C is an enlarged detail from FIG. 2B.

FIG. 2C shows the lower region of the pressing section 12.4' with the bearing surface 14' in detail. The bearing surface 14' is formed smooth and flat and, at its lateral edges, has projecting hooks or claws 13.1', 13.2', which are buried somewhat in the opposing bearing surface and prevent the bearing surface 14' sliding on the opposing bearing surface.

The contact spring element 12, 12' can be formed from any suitable metal or any suitable metal alloy with good electrical conductivity and good permanently resilient properties. Suitable materials are the alloys $CuSn_6$ and $CuNi_9Sn_2$, by way of example.

We claim:

1. A configuration for making electrical contact with an electric valve, comprising:

at least one contact spring element having an S-shaped section disposed outside a valve housing of the electric valve;

said contact spring element having an arcuate-shaped pressing section with a tinned, rounded bearing surface; and a flexible printed circuit board for making electrical contact with the electric valve, said flexible printed circuit board having an opposing contact element with a tinned opposing bearing surface;

in an assembled state, said tinned, rounded bearing surface of said contact spring element bearing against said tinned opposing bearing surface of said printed circuit board under spring pressure for making secure electrical and mechanical contact with said flexible printed circuit board.

2. The configuration according to claim 1, wherein said rounded bearing surface has a radius of approximately 1.2 to 1.7 mm.

3. The configuration according to claim 1, which comprises hooking elements formed on said pressing section and projecting beyond said bearing surface.

4. The configuration according to claim 1, wherein said contact spring element is formed of an alloy selected from the group consisting of a copper-tin alloy and a copper-tin-nickel alloy.

5. The configuration according to claim 1, wherein said copper-tin alloy is $CuSn_6$ and said copper-tin-nickel alloy is $CuNi_9Sn_2$.

6. In combination with a shift or pressure regulating valve of an automatic transmission in a motor vehicle, the configuration according to claim 1 for making contact between the regulating valve and an electric wiring element.

7. The configuration according to claim 1, wherein a spring force exerted on the opposing contact element is between 12 and 15 N.

8. The configuration according to claim 1, wherein said bearing surface of said pressing section is a structured surface.

9. A configuration for making electrical contact with an electric regulating valve of an automatic transmission in a motor vehicle, comprising:

contact spring element having an S-shaped section disposed outside a valve housing of the electric regulating valve;

said contact spring element having an arcuate-shaped pressing section with a tinned, rounded bearing surface; and a flexible printed circuit board for making electrical contact with the electric regulating valve, said flexible printed circuit board having an opposing contact element with a tinned opposing bearing surface;

in an assembled state, said tinned, rounded bearing surface of said contact spring element bearing against said tinned opposing bearing surface of said flexible printed circuit board under spring pressure for making secure electrical and mechanical contact with said flexible printed circuit board.

* * * * *